United States Patent [19]

Carré et al.

[11] Patent Number: 4,553,646
[45] Date of Patent: Nov. 19, 1985

[54] BRAKE MOTOR WITH AUTOMATIC ADJUSTMENT

[75] Inventors: Jean-Jacques Carré, Le Raincy; Pierre Pressaco, La Courneuve, both of France

[73] Assignee: Societe Anonyme D.B.A., Paris, France

[21] Appl. No.: 612,942

[22] Filed: May 21, 1984

[30] Foreign Application Priority Data

May 31, 1983 [FR] France .................. 83 08975

[51] Int. Cl.⁴ .................................... F16D 65/56
[52] U.S. Cl. ................... 188/196 BA; 188/79.5 GE; 192/111 A
[58] Field of Search ....... 188/196 BA, 71.9, 79.5 GE, 188/79.5 GT; 192/111 A

[56] References Cited

U.S. PATENT DOCUMENTS

| | | | |
|---|---|---|---|
| 2,669,327 | 2/1954 | Chamberlain et al. | 188/196 BA |
| 3,049,192 | 8/1962 | Klavon, Jr. | 188/196 BA X |
| 3,158,234 | 11/1964 | Henderson | 188/196 BA |
| 3,246,723 | 4/1966 | Pauwels | 188/196 BA |
| 3,261,434 | 7/1966 | Brucker | 188/196 BA |
| 3,261,435 | 7/1966 | Beatty | 188/196 BA |
| 3,326,331 | 6/1967 | Wallace | 188/196 BA X |
| 3,334,713 | 8/1967 | Russell | 188/196 BA |
| 3,356,193 | 12/1967 | Stowers | 188/71.9 X |

FOREIGN PATENT DOCUMENTS

| | | |
|---|---|---|
| 1447464 | 6/1966 | France . |
| 1470078 | 2/1967 | France . |
| 1492363 | 4/1967 | France . |
| 1109445 | 7/1964 | United Kingdom . |
| 1475109 | 2/1967 | United Kingdom ......... 188/196 BA |
| 1069135 | 5/1967 | United Kingdom . |
| 1092686 | 11/1967 | United Kingdom ............... 188/71.9 |

Primary Examiner—George E. A. Halvosa
Attorney, Agent, or Firm—Larry J. Palguta; Ken C. Decker

[57] ABSTRACT

Brake motor with automatic adjustment, comprising a body (20) which incorporates a groove (62). A piston is mounted in this body and has a pivot (48) which guides the piston in the groove. A pawl (46) mounted at one end on the pivot (48) and applied elastically via a slope (64) against a portion (66) fixed relative to the body (20) stresses a toothed wheel (44) in terms of rotation when the relative axial movement between the body (20) and piston exceeds a predetermined value. The toothed wheel (44) integral with a nut causes the lengthening of a screw/nut system, thus ensuring automatic adjustment. The invention is used for braking motor vehicles.

11 Claims, 17 Drawing Figures

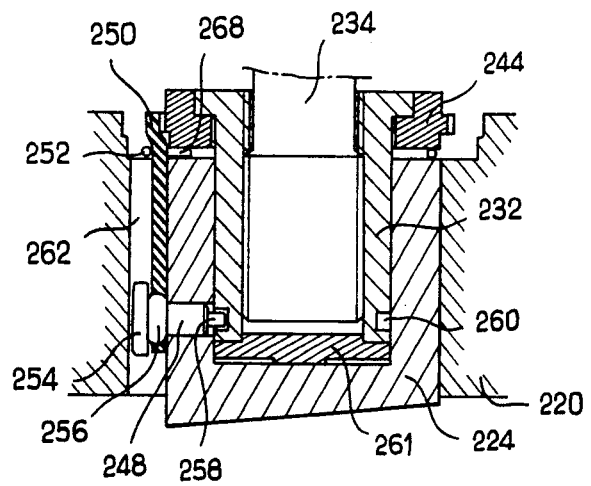
FIG_10
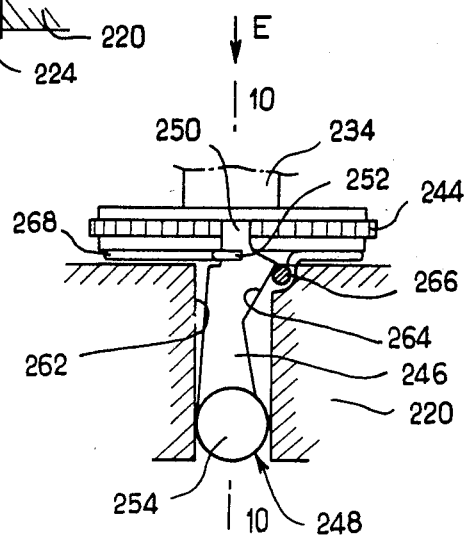
FIG_9
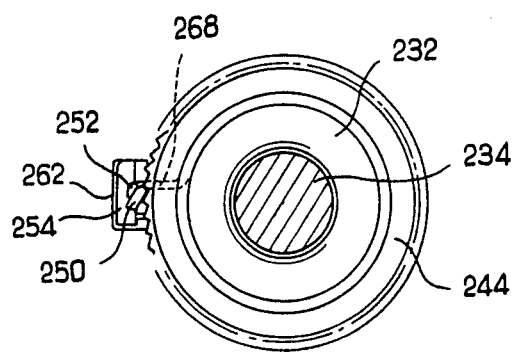
FIG_11

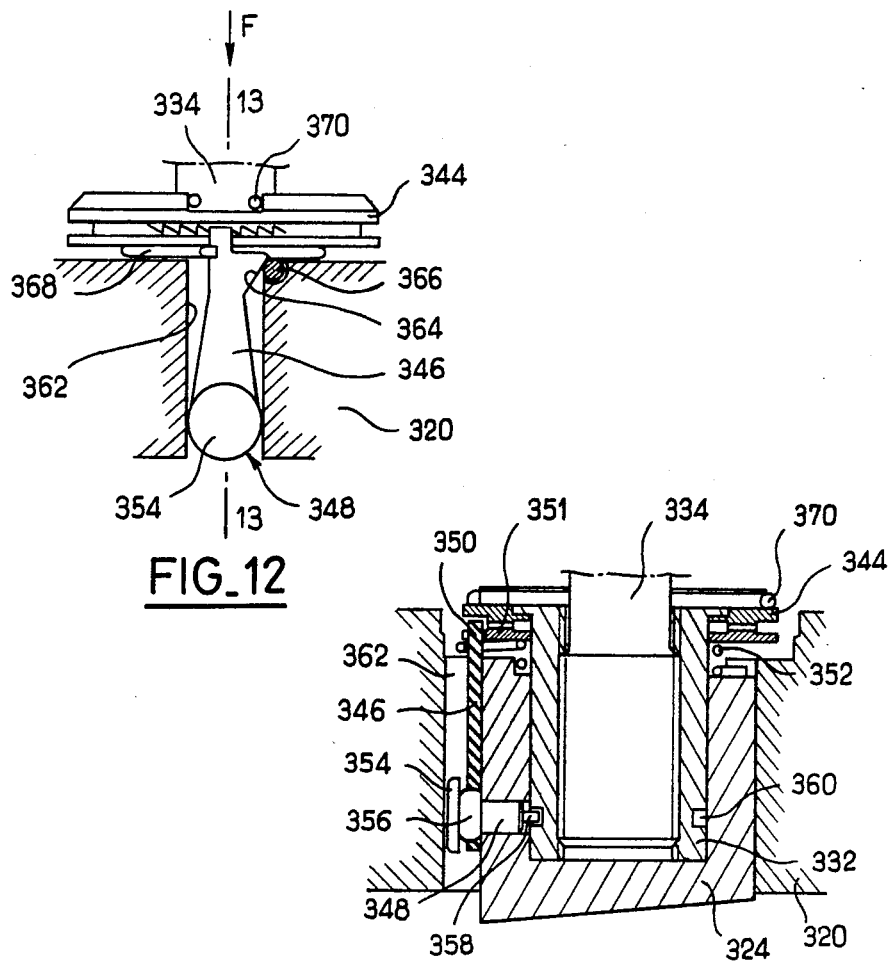
FIG_12
FIG_13
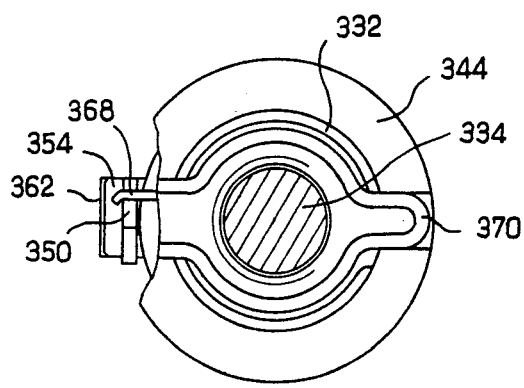
FIG_14

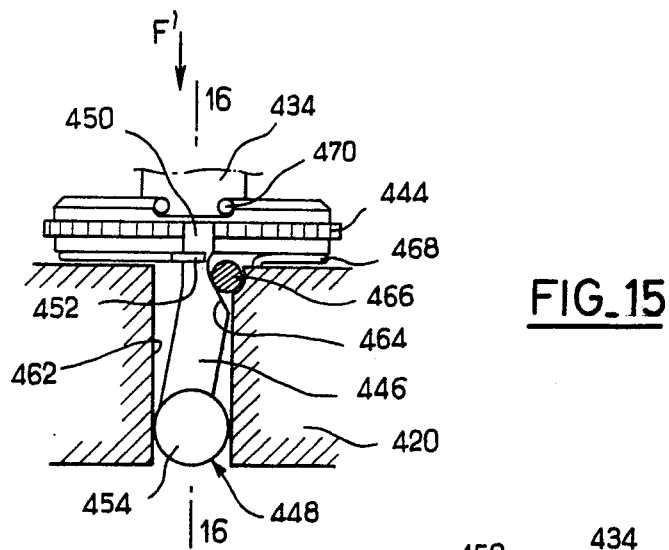
FIG_15
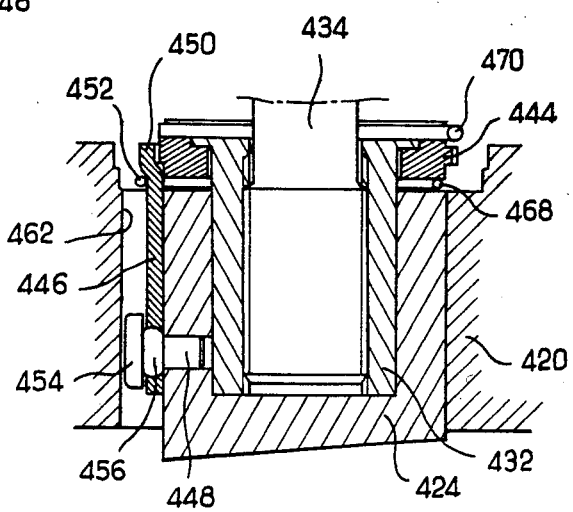
FIG_16
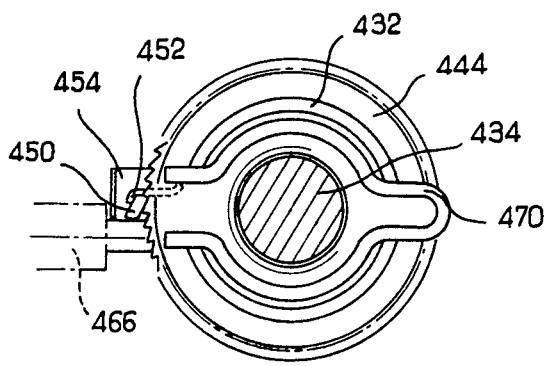
FIG_17

BRAKE MOTOR WITH AUTOMATIC ADJUSTMENT

The invention relates to a brake motor capable of activating a brake, intended particularly for equipping a motor vehicle.

The invention relates, in particular, to a brake motor with automatic adjustment, which is intended to compensate automatically for wear of the friction linings, so as to preserve the travel at the brake pedal and the mechanical control, to ensure that the brake is activated at a substantially constant and low level.

Many brake motors equipped with automatic adjustment devices are known, for example that described in French Pat. No. 1,447,464. However, this brake motor has some disadvantages, especially as regards the number and complexity of the components which make this brake motor, or more specifically the automatic adjustment, fragile and of insufficient reliability in view of the periods and conditions of use.

The invention proposes a brake motor with automatic adjustment, which has a simple construction and a considerably increased reliability.

For this purpose, the invention proposes a brake motor with automatic adjustment, of the type incorporating a screw/nut device, the lengthening of which is controlled by a device with a toothed wheel and a pawl which are sensitive to the relative axial displacement between a control piston and a fixed body receiving the said piston, characterized in that the said pawl is associated axially with the said piston, in that the said pawl has a slope interacting elastically with a part integral with the body, to convert the said relative displacement into a circumferential movement, and in that the said pawl is appliedelastically against the toothed wheel associated with the said nut.

It emerges that because of these characteristics the automatic compensation device as a whole is simplified considerably and its reliability consequently being increased.

Five embodiments of the invention will now be described by way of non-limiting examples, with reference to the attached drawings in which:

FIG. 9 is a view similar to FIG. 2 for a third embodiment;

FIG. 10 is a sectional view along the line 10—10 of FIG. 9;

FIG. 11 is an end view according to the arrow E in FIG. 9;

FIG. 12 is a view similar to FIG. 2, showing a fourth embodiment;

FIG. 13 is a sectional view along the line 13—13 of FIG. 12;

FIG. 14 is an end view according to the arrow F in FIG. 12;

FIG. 15 is a view similar to FIG. 2, showing a fifth embodiment;

FIG. 16 is a sectional view along the line 16—16 of FIG. 15; and

FIG. 17 is an end view according to the arrow F' in FIG. 15.

Figure 1:
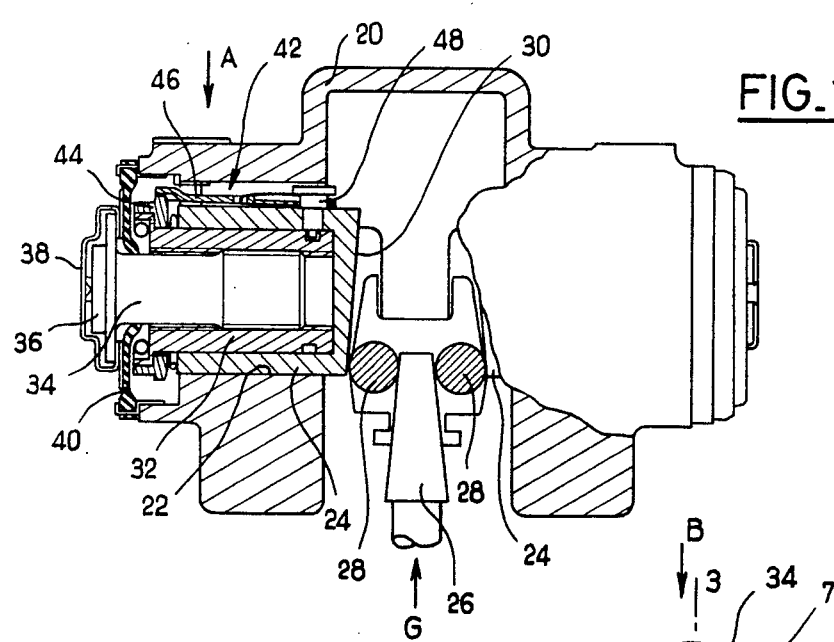
FIG. 1 is a partial sectional view of a brake motor produced according to the invention and used for controlling a drum brake.

The brake motor illustrated in FIG. 1 is of the type with wedge control, used particularly in drum brakes. This brake motor conventionally comprises a body 20 having two bores 22, in which are mounted pistons 24 capable of being moved away from one another by means of a wedge 26 and rollers 28 acting on the inclined bottoms 30 of the pistons 24 when the wedge 26 is displaced in the direction of the arrow G in FIG. 1. The pistons 24 are capable, by means of nuts 32 and screws 34, of moving apart the segments (not shown) of the drum brake, thus activating the brake. In a conventional way, the end 36 of the screw 34 has a device 38 which prevents the screw from rotating relative to the segment during the operation of the brake, but as a result of manual rotation of the screw 34 allows the latter to be screwed or unscrewed. Likewise in a conventional way, the end of the bore 22 is equipped with a protective cover 40 located between the body 20 of the brake motor and the screw 34, so as to protect the interior of the brake motor.

Figure 2:
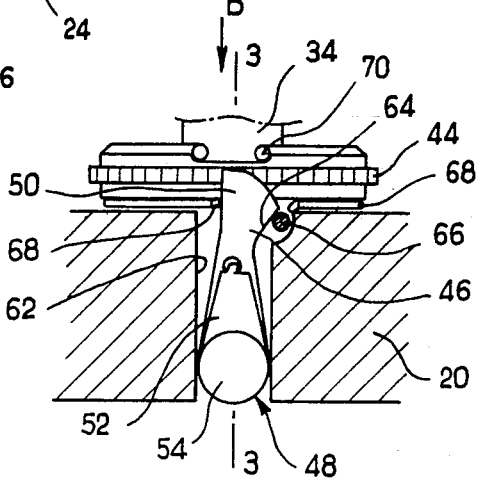
FIG. 2 is a partial enlarged view according to the arrow A in FIG. 1, showing the automatic adjustment device.
Figure 3:
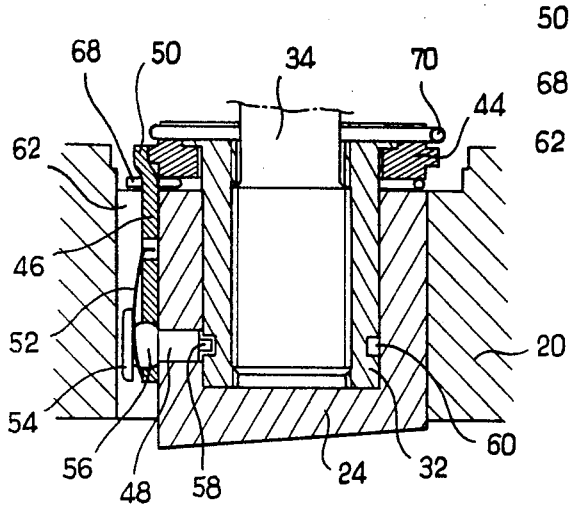
FIG. 3 is a sectional view along the line 3—3 of FIG. 2.

According to the invention, the brake motor incorporates an automatic adjustment device designated as a whole by reference numeral 42. With reference to FIGS. 1, 2, 3 and 4, it emerges that the automatic adjustment device 42 is formed, on the one hand, by the screw 34 and the nut 32 and, on the other hand, by a toothed wheel 44 associated with the nut 32 and controlled by a pawl 46 associated axially with the piston 24 by means of a pivot 48. Referring to FIGS. 2 and 3, it will be seen that the pawl 46 formed by a substantially flat plate has a first end associated with the pivot 48, so that the pawl follows the axial displacement of the piston 24, the pivot 48 being fastened rigidly to the piston 24.

Figure 4:
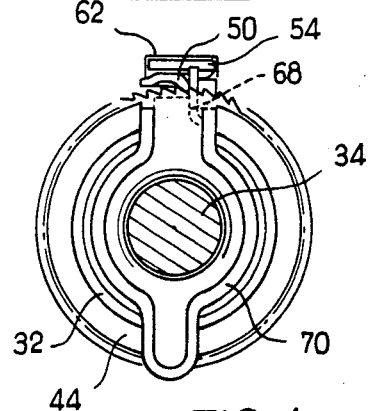
FIG. 4 is a partial end view according to the arrow B in FIG. 2.
Figure 5:
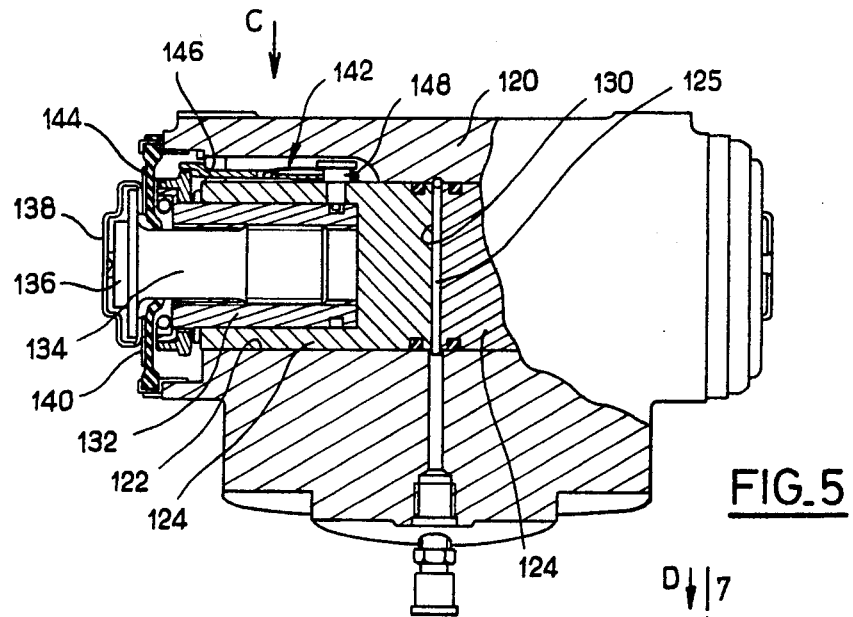
FIG. 5 is a partial sectional view of a second embodiment of the invention.
Figures 6, 7:
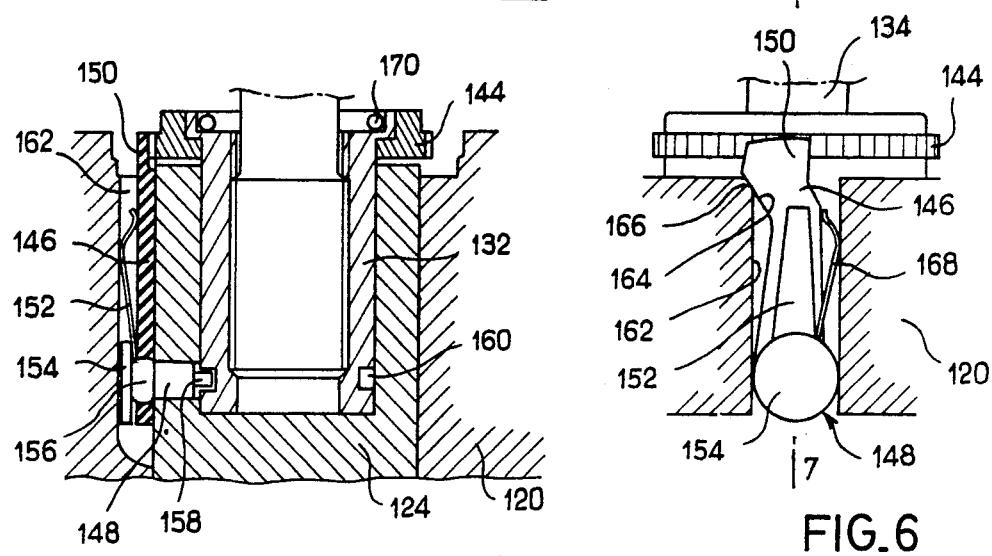
FIG. 6 is a partial enlarged view of the adjustment device according to the arrow C in FIG. 5.
FIG. 7 is a sectional view along the line 7—7 of FIG. 6.
Figure 8:
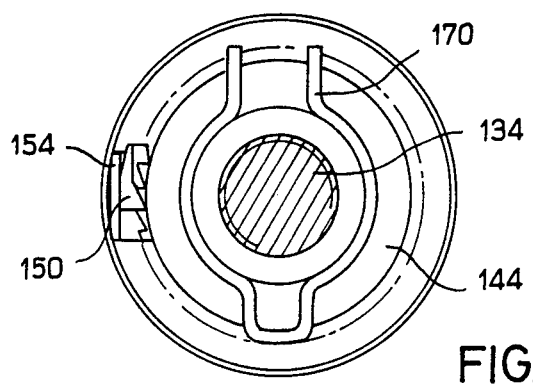
FIG. 8 is an end view according to the arrow D in FIG. 6.

The other end of the pawl 46 has a bent-back portion 50 of a shape matching the toothing of the toothed wheel 44. This bent-back portion 50 is applied elastically against the toothing by means of a spring 52 located under a head 54 of the pivot 48 and acting radially on the pawl 46. As shown more specifically in FIG. 3, the pivot 48 has a portion 56 in the shape of a portion of a sphere and forming a knuckle which allows the pawl 46 to rock about this portion 56 counter to the spring 52. It will also be seen in the same FIG. 3 that the pivot 48 has a projection 58 penetrating into a slot 60 formed in the nut 32 so as to limit the axial movement of the nut 32 relative to the piston 24. As can be seen more specifically in FIGS. 2 and 3, a portion forming the head 54 of the pivot 48 is mounted in a groove 62 formed in the body 20 of the brake motor, the diameter of the head 54 being such that the piston 24 and the pivot 48 as a whole are positioned circumferentially in relation to the body 20 and are capable of being displaced axially relative to one another because of this groove 62. Referring to FIG. 2, it will be seen that the pawl 46 has a slope 64 formed on the edge of the pawl and which is urged elastically against a stud 66, forming a fixed part integral with the body 20 by means of a spring 68 which is coiled round the nut 32 and one end of which is fastened to the piston 24 and the other end of which stresses the pawl 46 to the right with reference to FIG. 2. In this embodiment, the slope 64 diverges relative to the pawl progressively as it tends towards the other end of the pawl forming the portion 50. Referring to FIGS. 2, 3 and 4, it will be seen that the toothed wheel 44 is associated with the nut 32 by means of a spring 70 allowing slight relative rotary movements between the said toothed wheel and the nut in a way known per se, for example as described in French Pat. No. 1,447,464 already mentioned above, and this makes it possible to avoid damaging the bent-back portion 50 or the toothing of the wheel 44 if the force exerted to drive the nut 32 in rotation is too high.

The brake which has just been described by means of FIGS. 1 to 4 operates in the following way: when the brake motor is to be actuated, a thrust is exerted on the wedge 26 in the direction of the arrow G in FIG. 1. Under the effect of this thrust, the wedge penetrates between the two rollers 28 which roll, on the one hand, on the wedge 26 and, on the other hand, on the bottoms 30 of the pistons 24, and since the wedge and the bottoms 30 are inclined the pistons 24 are moved away from one another so as to stress the brake segments (not shown). The movement of the piston 24 shown in the left-hand part of FIG. 1 is therefore to the left at the moment when the brake is actuated. This movement of the piston drives the automatic adjustment assembly, incorporating among other things the nut, the screw and the pawl, by means of the pivot 48. Referring to FIG. 2, it will be seen that the upward displacement of the pivot 48 causes the upward movement of the pawl 46, and the toothed wheel 44 is likewise displaced upwards under the thrust of the piston 24. Since the spring 68 presses the slope 64 of the pawl 46 against the stud 66 integral with the body 20, any upward progress of the pivot 48 therefore causes the pawl 46 to rotate in a clockwise direction. If the axial progress of the piston 24 is sufficient, the portion 50 of the pawl 46 jumps over a tooth of the toothed wheel 44, and the spring 52 allows the portion 50 to remain applied against the flank of the tooth and then penetrate into the cavity of the following tooth. When the brake is released, the wedge 26 being drawn in the opposite direction to the arrow in FIG. 1, the pistons 24 move closer to one another under the effect of the restoring spring for the segments (not shown). This return movement in the direction of the arrow B in FIG. 2 of the piston 24 and consequently of the pivot 48 imposes an anti-clockwise movement on the portion 50 of the pawl 46, because the slope 64 is applied against the stud 66, and since the portion 50 is engaged in the toothing of the toothed wheel 44, the latter rotates by the amount of one tooth, thus driving in rotation the nut 32 which causes the screw 34 to advance in the lengthening direction. Automatic adjustment of the stroke of the pistons is obtained in this way. It is clear that if the axial stroke of the pistons is insufficient to impart to the pawl the movement necessary for passing a tooth, the pawl will return to its initial position without carrying out adjustment. If the axial force on the screw is such that the friction between the screw 34 and the nut 32 does not allow the nut 32 to rotate, the toothed wheel rotates relative to the fixed body 20, but also relative to the nut 32, by the angular amount of one tooth as a result of the elastic deformation of the spring 70 which will subsequently cause the nut 32 to rotate when the excessive force on the screw 34 has ceased.

As can be seen more specifically in FIG. 2, the head 54 of the pivot 48 ensures circumferential guidance both of the piston 24 and of the pawl 46, thus defining the relative position of the slope 64 and stud 66 integral with the fixed body 20. Referring to FIG. 3, it will be seen that the radial movement necessary for the portion 50 to jump over the teeth is permitted because of the knuckle shape of the portion 56 of the pivot 48. Moreover, it emerges from FIGS. 1, 2 and 3 that the automatic adjustment assembly 42 is integral with the piston 24 and can easily be removed from the brake motor simply by extracting the piston, without any dismantling or intervention with the exception of the removal of the protective cover 40. This sub-assembly which can be removed in one piece makes it possible, if necessary, to service the device which is the subject of the invention very easily.

FIGS. 5 to 8 show a second embodiment of the invention, in which the same components performing the same functions bear the same numbers increased by 100.

In contrast to the preceding brake motor, this is controlled hydraulically and has a chamber 125 capable of being connected to a pressure source (not shown). An increase in pressure in this chamber 125 stresses the two pistons 124 so that they move apart from one another. In the present embodiment, the spring which keeps the slope 164 of the pawl 146 pressed against a fixed part 166 integral with the body of the brake motor is embodied by a spring 168 accommodated in the groove 162 and bearing on the latter so as to stress the portion 150 of the pawl 146 to the left in relation to FIG. 6. The spring 168 is retained by the head 154 of the pivot 148. The system operates in an identical way, the only difference being that when the piston is displaced upwards, thus driving the pivot 148, still with reference to FIG. 6, the end 150 of the pawl rotates in an anti-clockwise direction so as to jump over a tooth, the direction of the toothing of course being opposite to that of the preceding embodiment.

In the embodiment illustrated in FIGS. 9 to 11, the same elements fulfilling the same functions bear the same numbers increased by 200. In this embodiment, the pawl 246 is stressed so as to bear on the stud 266 by means of the spring 268 surrounding the nut 232. This spring 268 has a bent-back end 252 which stresses the portion 250 of the pawl 246 so as to bear radially on the toothing of the toothed wheel 244. On the other hand, referring to FIG. 11, it will be seen that the toothing has two inclined flanks. In FIG. 10, it will be seen that the nut 232 bears on the bottom of the piston 224 via a bushing 261 which assists the rotation of the nut relative to the piston. This embodiment operates in a similar way to that described with reference to FIGS. 1 to 4, but with two differences, namely, on the one hand, the portion 250 bears radially on the toothed wheel 244 by means of one and the same single spring, and on the other hand this same spring allows the pawl to return to the preceding tooth because of the inclination of the toothing, if the rotational force of the nut 232 relative to the screw 234 exceeds a predetermined value defined by the angle of the toothing and the radial force on the end 252 of the spring 268. This solution avoids the need to fit the spring 70 of the first embodiment.

FIGS. 12 to 14 show a fourth embodiment, in which the same components performing the same functions bear the same numbers increased by 300. Referring to FIGS. 12 and 13, it will be seen that the pawl 346 interacts at its end 350 with a toothed ring 351 which itself interacts with the toothing of the toothed wheel 344, the two toothings being located opposite one another over a complete circumference and being applied against one another by means of a compression spring 352 located between the piston and the ring 351. One end of this spring 352 terminates in a bent-back end 368 which applies the slope 364 elastically against the fixed part 366, the spring 352 also being subjected to torsion. This brake motor operates in a similar way to that of the first embodiment, except that to jump over a tooth the pawl 346 drives in rotation the toothed ring 351 which, by compressing the spring 352 axially, can shift angularly relative to the toothed wheel 344. In this embodiment, the pawl function is performed by the pawl 346 and the toothed ring 351. When the brake is released the slope 364 drives the toothed ring 351 and consequently the toothed wheel 344 which causes the nut 332 to rotate and thus ensures the adjustment of the brake motor.

FIGS. 15 to 17 show a fifth embodiment in which the same components performing the same functions bear the same numbers increased by 400. In this embodiment, the slope 464 converges relative to the pawl 446 progressively as it approaches the other end of the pawl having the portion 450.

This fifth embodiment operates in a different way from the preceding ones in that the automatic adjustment device takes effect as soon as the brake is activated, because of the converging inclination of the slope 464. Two cases can arise, namely, either the rotational force of the nut 432 is sufficiently low and this is then driven by the toothed wheel 464, or the rotational force of the nut 432 is too high and the spring 470 then allows relative movement between the nut 432 and the toothed wheel 444, adjustment taking place when the rotational force of the nut becomes less than the force stored in the spring 470. When the brake is released, if the nut has rotated and if the axial stroke of the piston assembly is sufficient the portion 450 jumps over a tooth and is capable of fresh adjustment as soon as the brake is subsequently activated.

The advantage of this system in comparison with the preceding ones is that a more substantial force is available to carry out adjustment; in fact, it is the control (wedge control or hydraulic control) of the brake motor which causes the adjustment and not the restoring spring for the segments (not shown).

It should be noted, with reference to FIGS. 15 and 17, that in this embodiment the stud 466 integral with the body 420 prevents the piston 424 from being removed because of the head 454 of the pivot 448. The stud 466 is produced by means of a screw screwed into the body and it is necessary to remove it in order to extract or install the piston equipped with its automatic adjustment device.

It will be seen from the foregoing description that the pawl (46, 146, 246, 346-351, 466) is accommodated partially in the guide groove (62, 162, 262, 362, 462) formed in the body (20, 120, 220, 320, 420) of the brake motor; it is therefore suitably protected, and since it is produced by means of a substantially flat blade, it is easy to manufacture and it makes the device especially reliable.

The invention which has just been described by means of the five preceding embodiments is not of course limited to these particular embodiments which can undergo modifications without departing from the scope of the present invention.

I claim:
1. Brake motor with automatic adjustment of the type incorporating a screw/nut system, the lengthening of which is controlled by a device with a toothed wheel and with a pawl which are sensitive to relative axial displacement between a control piston and a fixed body receiving said piston, characterized in that said pawl is associated with said piston to move axially therewith by means of a pivot forming a knuckle, which is functionally integral with said piston, in that said pawl
   has a slope interacting elastically with a part fixed to said body, to convert said relative axial displacement into a rotary movement of a portion of said pawl, in that said pawl is applied elastically against the toothed wheel associated with said nut and in that said pivot incorporates
   a portion of which is slidable in a groove formed in the body, thus ensuring circumferential relative positioning between the body, the piston and the slope.
2. Brake motor according to claim 1, characterized in that the pawl is partially accommodated in the groove.
3. Brake motor according to claim 2, characterized in that the pawl is formed by a substantially flat plate having one end associated with the pivot, another end interacting elastically with said toothed wheel and possessing a central zone having said slope.
4. Brake motor according to claim 3, characterized in that a first spring retained by said pivot and located in said groove applies said pawl radially and elastically against said toothed wheel.
5. Brake motor according to claim 4 characterized in that a second spring bearing on the piston applies said slope elastically against said part fixed to the body.
6. Brake motor according to claim 3, characterized in that a spring bearing on the piston applies said slope elastically against the fixed part, and in that
   said spring has a bent-back end applying said pawl radially and elastically against said toothed wheel.
7. Brake motor according to claim 6, characterized in that said toothed wheel has for each tooth two inclined flanks which allow a bent-back portion to move radially away from said toothed wheel counter to said spring when the force for rotating the toothed wheel as a result of interaction between the slope and the fixed part exceeds a value predetermined by the force of the spring and the inclination of said flanks.
8. Brake motor according to claim 2, characterized in that the pawl is formed by a pawl which drives a toothed ring interacting elastically with the toothed wheel, the toothing of said ring being axially opposite the toothing of the said toothed wheel, by means of a compression spring located between said piston and said ring.
9. Brake motor according to claim 8, characterized in that the compression spring, has a bent-back end which applies the slope against said fixed part elastically as a result of the torsion of said spring.
10. Brake motor according to claim 1, characterized in that the pivot has a projection penetrating into a slot formed in said nut, allowing the latter to rotate, but limiting the axial displacement between the piston and the nut.
11. Brake motor according to claim 11, characterized in that the piston and automatic adjustment device form a subassembly which can be removed in one piece.

* * * * *